G. J. BOUTET.
VAPORIZER FOR INTERNAL COMBUSTION ENGINES.
APPLICATION FILED OCT. 20, 1909.

1,140,944.

Patented May 25, 1915.
5 SHEETS—SHEET 1.

WITNESSES
J. P. Davis

INVENTOR
Georges Joseph Boutet
BY
ATTORNEYS

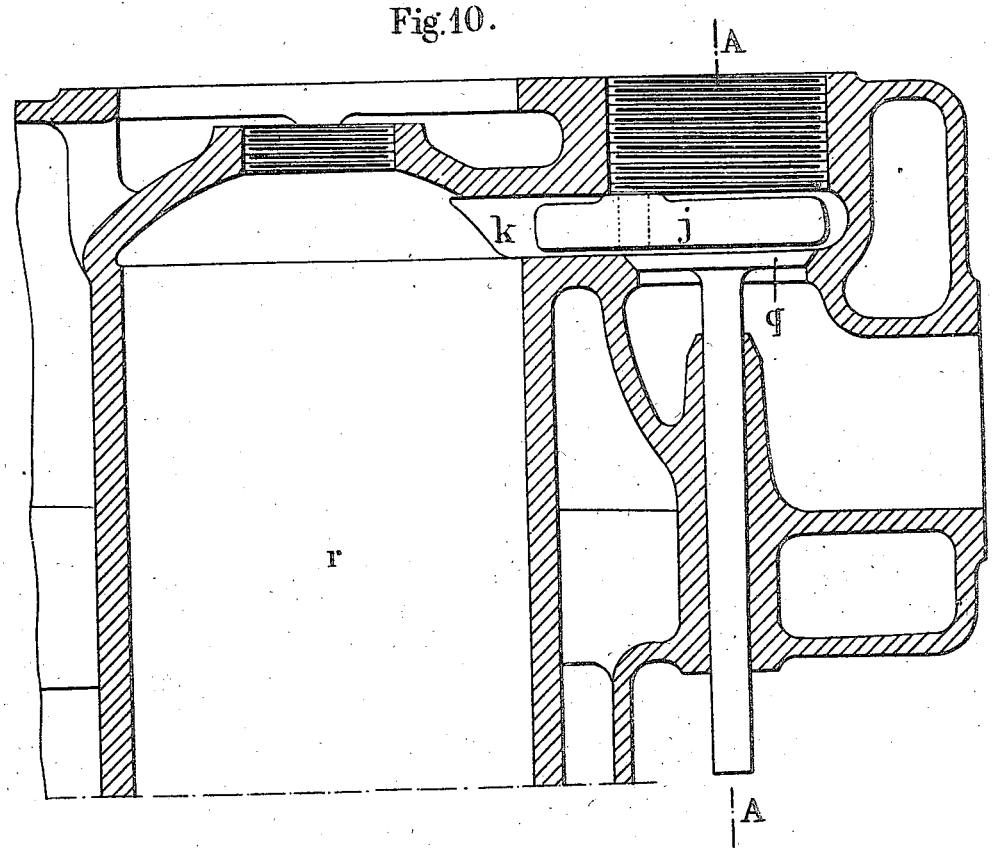

G. J. BOUTET.
VAPORIZER FOR INTERNAL COMBUSTION ENGINES.
APPLICATION FILED OCT. 20, 1909.

1,140,944.

Patented May 25, 1915.

5 SHEETS—SHEET 3.

WITNESSES
J. P. Davis

INVENTOR
Georges Joseph Boutet
BY
ATTORNEYS

G. J. BOUTET.
VAPORIZER FOR INTERNAL COMBUSTION ENGINES.
APPLICATION FILED OCT. 20, 1909.

1,140,944.

Patented May 25, 1915.
5 SHEETS—SHEET 4.

WITNESSES

INVENTOR
Georges Joseph Boutet
BY
ATTORNEYS

G. J. BOUTET.
VAPORIZER FOR INTERNAL COMBUSTION ENGINES.
APPLICATION FILED OCT. 20, 1909.

1,140,944.

Patented May 25, 1915.
5 SHEETS—SHEET 5.

WITNESSES

INVENTOR
Georges Joseph Boutet
BY
ATTORNEYS

UNITED STATES PATENT OFFICE.

GEORGES JOSEPH BOUTET, OF PARIS, FRANCE.

VAPORIZER FOR INTERNAL-COMBUSTION ENGINES.

1,140,944.  Specification of Letters Patent.  Patented May 25, 1915.

Application filed October 20, 1909. Serial No. 523,690.

*To all whom it may concern:*

Be it known that I, GEORGES JOSEPH BOUTET, of 39 and 41 Rue des Cloÿs, in the city of Paris, Republic of France, engineer, have invented a Vaporizer for Internal-Combustion Engines, of which the following is a full, clear, and exact description.

This invention relates to an apparatus permitting to use in internal combustion engines the most diverse liquid fuels and particularly those which are not volatile to the ambient temperature, such as the heavy hydrocarbons, kerosene, schist-oil, etc. This apparatus is characterized essentially by the application, between the organ serving for the admittance of the liquid fuel and the cylinder of the engine, of a mass of metal or of any other suitable material, exposed directly and without interposition of any organ to the heat produced by the explosions and on which the liquid fuel is projected and vaporized instantaneously. This liquid enters into the apparatus either by means of a valve with a double cone arranged inside a hollow metal body which is screwed on the cylinders of the engines instead of one of the inspection plugs and permitting the simultaneous admission of this liquid and of the air, or by means of a spraying nozzle or of any other suitable device. The mass heated by the heat of the explosion is placed either in the hollow body indicated above or in a chamber arranged laterally relatively to the cylinder of the engine, or still in the conduit-pipe which puts into communication this cylinder with the inlet and exhaust valves. The upper part of the piston may, in certain cases, be provided with a cap or a metal ring which being heated to a high temperature by the explosions will permit to complete the evaporation of the liquid fuel.

Figure 1:
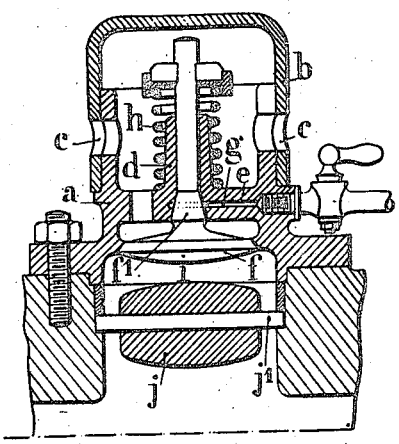
Figure 2:
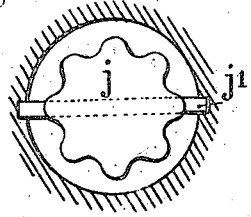
Figure 3:
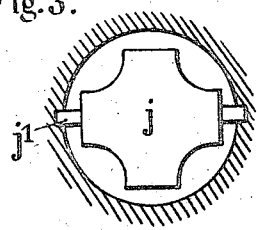
Figure 5:
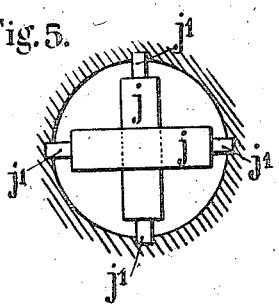
Figure 4:
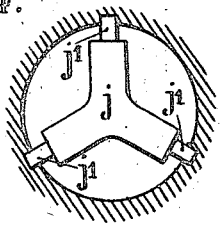
Figure 9:
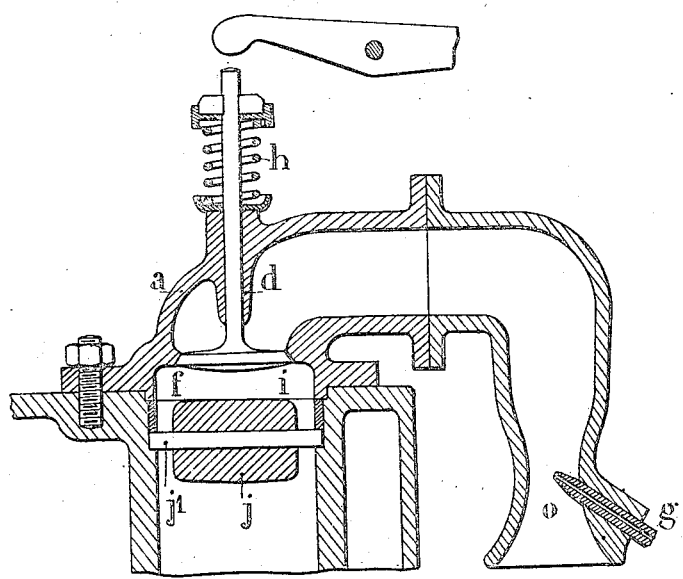
Figure 8:
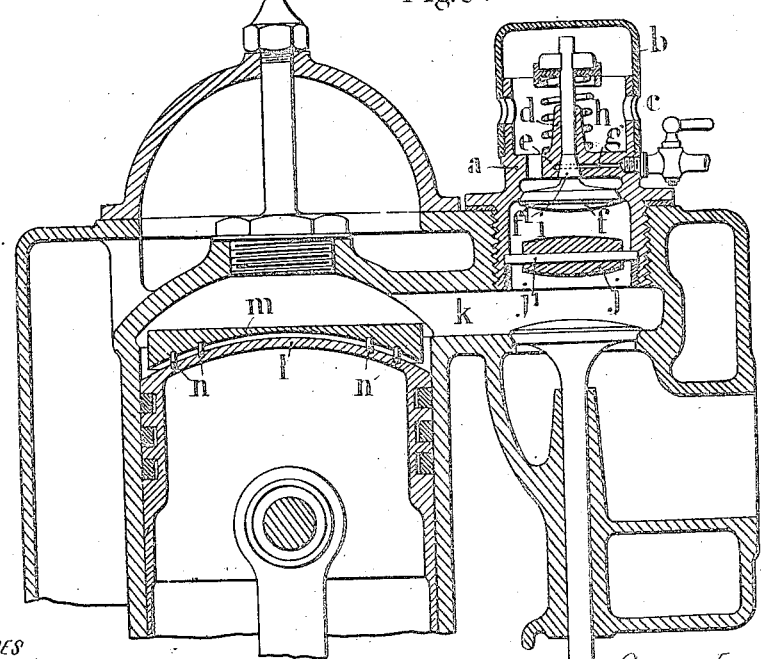
Figure 11:
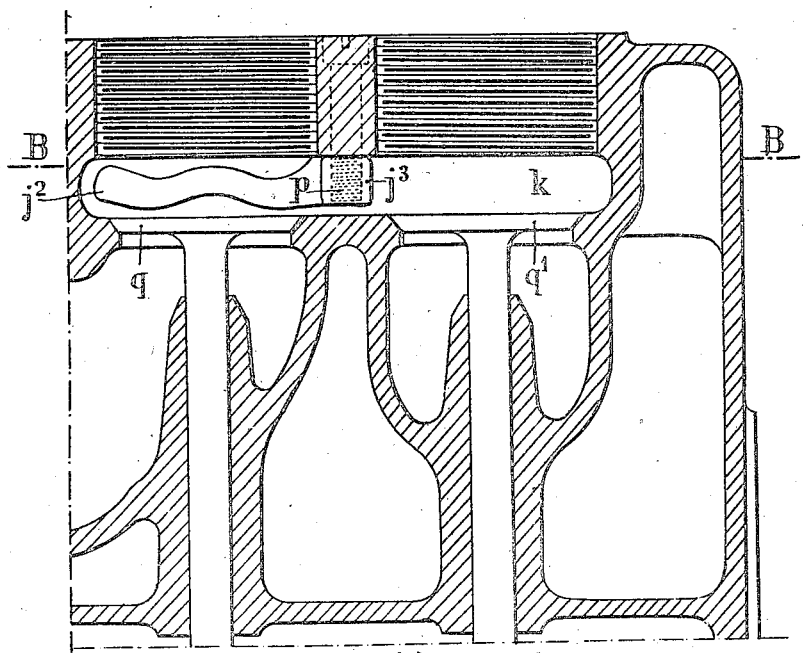
Figure 12:
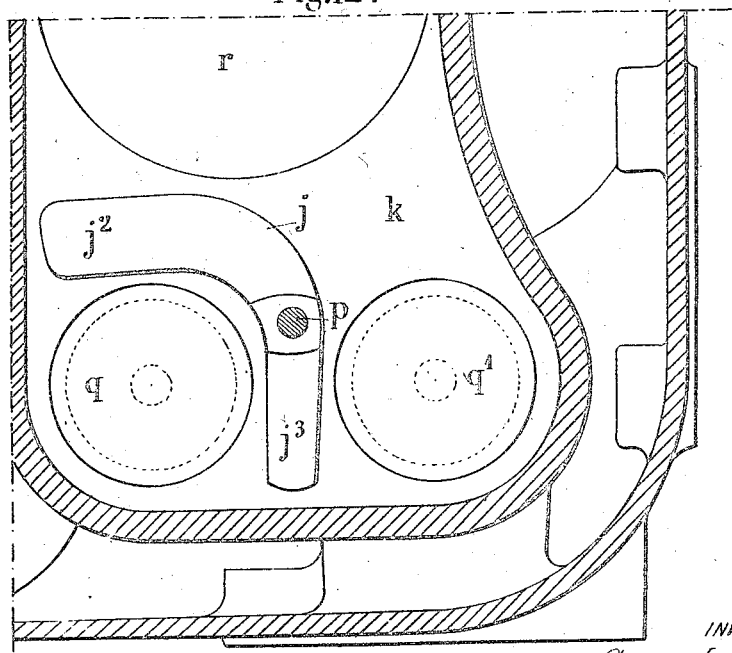
Figure 13:
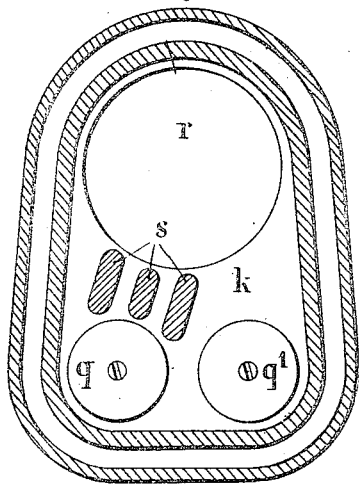
Figure 14:
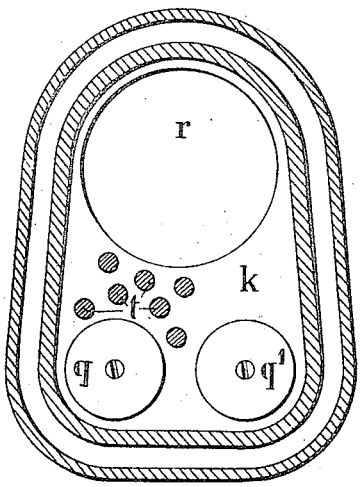
Figure 15:
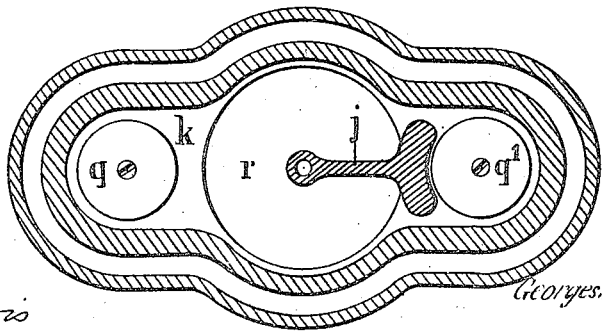

The invention is shown by way of example in the accompanying drawings, in which:

Figure 1 shows in vertical section an apparatus arranged according to the principle of the present invention. Figs. 2 to 7 show different forms which can be given to the mass constituting a mixer. Fig. 8 shows a modified form of the apparatus illustrated in Fig. 1. Fig. 9 is another modified form of this apparatus. Fig. 10 shows in vertical section an engine provided with the mass which is to store the heat and illustrated in Figs. 6 and 7. Fig. 11 is a longitudinal vertical section made according to line A—A of Fig. 10. Fig. 12 is a horizontal section made according to line B—B of Fig. 11. Figs. 13 to 15 show modified forms of the mass.

In Figs. 1 to 5 of the drawings, the apparatus comprises a metal body $a$ which is secured on the engine instead of the inspection plug of the exhaust valve or of the inlet valve. On the body $a$ can be screwed a cap $b$ provided with side openings $c$ permitting the admission of the air into the apparatus. Inside the body $a$ and at the center of the same is arranged a sleeve $d$ supported by horizontal arms $e$ between which can pass the air entering by the opening $c$. In the sleeve $d$ is inserted the rod of a valve $f$ provided with a cone $f^1$. The cone $f^1$ is adapted to close the circular channel $g$ admitting the liquid fuel and which is in communication with the feed tank. The valve $f$ serves for the admission of liquid and air inside the apparatus. The valve $f$ and the cone $f^1$ can be pressed on their seats under the action of a suitably arranged coiled spring $h$. Underneath the valve $f$, the metal body $a$ forms a circular chamber $i$ which is in direct communication with the combustion chamber of the engine. In this chamber $i$ is placed a mass $j$, of metal or of any other suitable material which stores the heat and maintained in position by a transverse pin $j^1$. This mass is arranged so as to leave between it and the inner wall of the chamber $i$ a clear space to give passage on the one hand to the combustible liquid and to the air coming in by the valve $f$ and on the other hand to the hot gases produced by the explosions of the explosive mixture inside the cylinder of the engine. The metallic mass $j$ can be therefore entirely surrounded by these hot gases, in such a manner that it will absorb a part of this heat and will be brought to a high temperature.

The operation of the apparatus thus arranged is as follows: The engine being started, at each period of suction, the valve $f$ is lifted from its seat by reason of the partial vacuum produced in the chamber $i$ by the downward movement of the piston and allows the passage of the exterior air entering through the opening $c$ of the cap $b$. At the same time the combustible liquid coming in by the channel $g$ falls on the head of the valve $f$, the cone $f^1$ being lowered with the latter. The combustible liquid is carried off by the sucked air under the form of more or less fine small drops and passes with this air in the chamber $i$ by turning around the edge of the valve $f$. The mixture of liquid and air continuing to be sucked in comes into contact with the mass $j$ which is brought to a high temperature by the heat of the explosions. The combustible liquid in coming into contact with the walls of the mass $j$ is instantaneously vaporized. This vaporization is obtained not only by the high temperature of the mass $j$ but by the relative vacuum created in the chamber $i$ and by the rapidity of the passage of the small liquid streams between the side edges of the mass and the inner wall of the chamber $i$. The vapors being carried along by the air and intimately mixing with the same, this mixture has always a sufficient quantity of air for preventing the formation of solid deposits of carbon, under the form of coke or of dirt, which are extremely prejudicial to the good working of engines. The mass $j$ plays the part of a heat accumulator. This mass absorbs the calories during the explosion and returns these calories to the combustible liquid in order to vaporize the same instantaneously.

It results from the foregoing that the masses $j$, which constitute real mixers, may be arranged in different shapes, according to the combustible liquids used, and that in their construction metals or materials of different conductivities may be used. When the combustible liquid is very heavy, the mass $j$ will be preferably given the shape shown in Fig. 2, in which the periphery of the mass is provided with vertical grooves. This mass can also have the shape illustrated in Fig. 3 and present four vertical channels. It can have also the shape of a star with any number of branches (Fig. 4) or present the shape shown in Fig. 5, that is to say that the mass may be constituted by two or more metallic bars crossing one another according to different planes. This latter arrangement presents the advantage of forming baffle plates determining an energetic stirring up of the explosive mixture. Whatever may be the shape of the mass $j$, this mass can be removable, as shown in the drawing, or integral with the metal body $a$ or body of the cylinder. In this latter case, the mass $j$ can be made hollow and form a conduit in which may be caused to circulate from the exterior a hot fluid water or gas in order to reheat the mass and facilitate the starting of the engine when the latter is cold.

As indicated above, the present apparatus is so arranged as to be in direct communication with the combustion chamber of the engine.

Fig. 1 of the drawing shows the apparatus placed directly above the combustion chamber. In Fig. 8 is illustrated an apparatus placed on the side of this combustion chamber. In this case, the circular chamber $i$ communicates with the combustion chamber by means of a conduit-pipe $k$ of suitable width. With this arrangement, in order to facilitate the vaporization of the combustible liquid when the latter is particularly heavy, the piston $l$ of the engine can be provided at its upper part with a cap $m$ made of a metal which is a very good conductor of heat. This cap is placed at a certain distance from the upper part of the piston and is fixed on the latter by means of studs $n$, so that the gases produced by the explosions can circulate freely around said cap. When the explosion is produced in the cylinder, the cap $m$ stores the heat, so that the evaporation of the liquid produced by the passage of the latter against the mass $j$ is completed by the cap $m$ which vaporizes the liquid not vaporized by its contact with the mass $j$. According to the nature of the liquid used, the cap $m$ may have variable dimensions. In certain cases, this cap may be replaced by a simple metal ring.

The apparatus illustrated in Fig. 1 is provided with an automatic valve, but the operation of this apparatus will not be changed if the valve is controlled mechanically or if this valve is replaced by any other distribution device: slide valve, cock, etc. The method of distribution of the liquid can also be different from that described above.

Fig. 9 shows by way of example an apparatus mounted on an engine provided with a driven valve in which the liquid arrives by an ordinary pulverizer $o$. This arrangement may present advantages in the case of engines with several cylinders, so as to have a single liquid inlet and a single adjustment for air and liquid, whatever may be the number of cylinders. This arrangement permits also to place the valves in any position, vertical or inclined.

It is to be understood that in case the engines would be provided with several suction valves, a certain number of the latter may not be provided with mixers and give passage to pure air without adjunction of liquid fuel.

The mass $j$ instead of being placed in a special chamber situated either directly above the cylinder of the engine or laterally relatively to this cylinder, can have forms and dimensions permitting to place the said mass in the channel which puts into communication the cylinder with the feed and exhaust valves. Figs. 10 to 12 show a mass placed in these conditions. In these figures, the mass $j$ has the shape illustrated in Figs. 6 and 7, that is to say that it presents two branches $j^2$ and $j^3$ forming between them a right angle and connected by a round part. This mass is provided with a threaded opening receiving a screw $p$ permitting to secure the mass inside the channel $k$, which puts in communication the feed and exhaust valves $q$ and $q^1$ with the cylinder $r$ of the engine. The mass $j$ is placed inside the channel $k$, so that the branch $j^3$ is situated between the two valves and that the branch $j^2$ is placed between the inlet valve $q$ and the cylinder $r$. It will be easily understood that the mass $j$ thus arranged in the channel $k$ will be brought to a high temperature by the heat produced by the explosions in the cylinder $r$. On the other hand, the explosive mixture, during the period of suction, is compelled to turn around the mass $j$ before entering in the cylinder. The combustible liquid in coming into contact with the walls of this mass, is instantaneously vaporized, as indicated above. By reason of its shape, the mass $j$ presents a large surface, so that the vaporization of the liquid is always insured.

In order to facilitate the passage of the hot gases and of the explosive mixture, the branch $j^2$ of the mass $j$ will preferably present an undulated shape in the direction of its length (Figs. 6 and 11). However, this branch could be rectilinear or have any other shape in the direction of its length.

The mass $j$, instead of being fixed between the two valves $q$ and $q^1$, could be mounted on the inspection plug of the suction valve; in this case, the shape of the branches $j^2$ and $j^3$ would be modified in order to permit this arrangement of the mass.

The forms and dimensions of the mass $j$ can be considerably varied, so as to permit to place the said mass in the channel putting in communication the inlet valve with the cylinder, whatever may be the shape and the position of this channel. The mass $j$ made in one piece can also be replaced by a series of blades $s$ cast with or jointed in the channel $k$ and placed in the axis of suction, as shown in Fig. 13. In order to gasify the mixture, a series of rods cast with the casing of the engine or of pins $t$ arranged vertically or horizontally in quincunx order in the channel $k$ (Fig. 14) may also be used. These rods or these pins $t$ can have all the same length or have different lengths according to the requirements.

Fig. 15 shows in horizontal section an engine in which the inlet and exhaust valves are arranged on each side of the cylinder. In this case, the mass $j$ is fixed by one of its branches under the inspection plug of the cylinder.

The forms of execution indicated above are only given by way of example; they can be varied according to the shape of the engines or of their channels, but in any case, whatever may be the form adopted, the gasifying device will always be placed between the inlet valve and the cylinder of the engine and placed so as to be exposed to the heat produced by the explosions in this cylinder.

Claims:

1. In an internal combustion engine the combination with the cylinder of the engine, the piston and the inlet valve for the explosive mixture, of a vaporizer comprising a mass located between the inlet valve for the explosive mixture and the said cylinder, and connected to the engine body at but one or two points, to avoid the diffusion of the heat, and a vaporizer carried at the end of the piston, the said vaporizers being adapted to be heated by the hot gases produced by the explosions, the last mentioned vaporizer being supported above the end of the piston to permit the hot gases to circulate freely around the same.

2. In an internal combustion engine the combination with the cylinder of the engine having a combustion chamber, the piston, and the inlet for the explosive mixture, the said engine having a chamber located between the inlet for the explosive mixture and the combustion chamber and communicating with the latter, of a vaporizer comprising a metallic mass supported in said chamber and on which the combustible liquid is projected, the said mass being exposed to the hot gases, produced by the explosions, a vaporizer comprising a cap at the upper end of the piston, and adapted to be heated by the explosions, and studs for connecting the cap with the end of the piston and spacing the same from the said end, so that the gases produced by the explosions can circulate freely around the vaporizer and between the same and the end of the piston.

3. In an internal combustion engine, the combination with the cylinder of the engine having a combustion chamber, the piston and the inlet valve for the explosive mixture, the said engine having a circular chamber located below the inlet valve and between the same and the combustion chamber and communicating by a passage with the latter, of a vaporizer located in said chamber below the inlet valve and between the same and the combustion chamber, and a second vaporizer comprising a metallic cap of less diameter than the piston, and located at the end thereof, and means for holding the said cap spaced from the end of the piston,
5 whereby the hot gases can circulate beneath the cap and around the same.

The foregoing specification of my apparatus permitting to use in internal combustion engines all liquid fuels, signed by me this fifth day of October, 1909.

GEORGES JOSEPH BOUTET.

Witnesses:
  H. C. Coxe,
  R. Chiriot.